United States Patent [19]

Löhmann

[11] 3,949,656

[45] Apr. 13, 1976

[54] AIR OUTLET GRILL FOR VENTILATING THE PASSENGER COMPARTMENT OF A MOTOR VEHICLE

[75] Inventor: Otto Schäfer Löhmann, Wolfsburg, Germany

[73] Assignee: Volkswagenwerk Aktiengesellschaft, Wolfsburg, Germany

[22] Filed: May 31, 1974

[21] Appl. No.: 475,294

[30] Foreign Application Priority Data
June 8, 1973   Germany............................ 2329244

[52] U.S. Cl............................ 98/40 VM; 98/121 A
[51] Int. Cl.²...................... F24F 7/00; F24F 13/08
[58] Field of Search .............. 98/8, 9, 18, 40 R, 44, 98/40 C, 121, 40 VM, 121 A, 101–103

[56] References Cited
UNITED STATES PATENTS

| | | | |
|---|---|---|---|
| 1,170,308 | 2/1916 | Hertz............................... | 98/40 VM |
| 2,029,153 | 1/1936 | Burner............................. | 98/121 A |
| 3,240,145 | 3/1966 | Lambert........................... | 98/40 R |
| 3,456,574 | 7/1969 | Jakeway........................... | 98/40 VM |
| 3,587,442 | 6/1971 | Jakeway........................... | 98/121 A |
| 3,641,913 | 2/1972 | Dennis............................. | 98/40 VM |

FOREIGN PATENTS OR APPLICATIONS

| | | | |
|---|---|---|---|
| 44,395 | 7/1931 | Denmark.......................... | 98/38 A |
| 718,400 | 11/1954 | United Kingdom ............ | 98/40 VM |

Primary Examiner—William E. Wayner
Assistant Examiner—Henry C. Yuen
Attorney, Agent, or Firm—Ernest F. Marmorek

[57] ABSTRACT

An air flow control grill is disclosed having a housing with an input section and an adjusting section downstream with respect to the input section, the adjusting section having a funnel-shaped sectional area, a plurality a vane-shaped air guiding elements arranged in a pair of groups in the adjusting section and being joined together in each group and being pivotally mounted in each group. The air guiding elements in each group being arranged parallelly with respect to each other and each group being adapted to be pivoted independently to positions allowing variation in the direction and speed of airflow.

11 Claims, 6 Drawing Figures

AIR OUTLET GRILL FOR VENTILATING THE PASSENGER COMPARTMENT OF A MOTOR VEHICLE

FIELD OF THE INVENTION

The present invention relates to an air outlet grill and specifically to an air outlet grill for use in the ventilating of the passenger compartment of a motor vehicle and which is contained in the air inlet region and having lamellae or vane-shaped air guiding elements placed in the adjusting region of the grill which is downstream to the air inlet direction and, wherein the air guiding vanes are journaled pivotally about pivot axles running parallel with respect to each other and in a plane perpendicular to the axis of the air outlet grill.

BACKGROUND OF THE INVENTION

For the distribution of the fresh air or warm air within the passenger compartment of motor vehicles usually air outlet grills are used which are provided with adjusting elements allowing only for the changing of the flow direction. In order that the speed of air flow could also be regulated in the vicinity of the passengers, that is, in order that the cooling or warming effect of the outlet grill could be regulated, the air output from the grill must also be changed. The latter expedient presents, however, difficulties in that in order that the certain climate could be sustained in the passenger compartment, a certain air output must be maintained.

German OLS (layed open application) No. 1,430,300 (63c-74) represents an example for an arrangement having a plurality of vane-shaped air guiding elements which can be pivoted only together, therefore, they allow only for a change of the direction of the exiting air. In the latter paper, all air guiding elements which are arranged in a frame have a common pivoting axis.

DAS No. 1,812,283 (63c-74) on the other hand, provides for vane-shaped air guiding elements which are pivotable about an individual axle, which, however, in order to perform a common pivoting movement, are connected by transverse webs. Also in this literature, when the air guiding elements are operated, only a changing in the direction of the air flow is attained, however, without attaining a change in the flow speed at the vicinity of the body exposed to the air flow.

The arrangement according to U.S. Pat. No. 2,790,371 issued Apr. 30, 1974 differs from the above-discussed technical literature in that the lamellae or vane-shaped air guiding elements used by the patented structure can be pivoted independently from each other always about one of several parallel and adjacently lying pivot axles. The structure of the aforementioned patented air outlet grill provides also the possibility for pivoting the outer lying vanes with respect to each other in such manner that they enclose an angle with respect to each other directed along the air flow. On the other hand, the independent pivotability of the different air guiding elements provides also the possibility of creating angles directed in opposite directions, so that such known arrangement provides not only for the possibility of changing the flow direction, but also provides the possibility of changing the width of flow and thereby the speed of flow in the vicinity of the body exposed to the air flow.

The last-mentioned arrangement is, however, somewhat difficult to handle in practical use by the passengers of a motor vehicle since it requires the adjustment of a plurality of vanes individually. In the embodiment illustrated in the aforementioned patent, there are four guiding elements which are to be adjusted independently from each other which fact represents a rather complicated expedient for the users of the motor vehicle who, in most case, are technically untrained.

SUMMARY OF THE INVENTION

It is, therefore, an object of the present invention to provide an air outlet grill for the ventilation of the passenger compartment of a motor vehicle which without changing the air output quantity will allow for changing not only the direction of the air flow, but also for the changing of the speed of the air flow in the vicinity of a body exposed to the air flow within the passenger compartment and without requiring a complicated operation during adjustment.

According to the present invention, the cross-sectional dimension of the adjustable region of the outlet grill increases in the direction of the air flow and is provided with air guiding elements made up from a pair of independent groups, wherein each group includes air guiding elements placed parallel with respect to each other and pivotable together, but the groups being pivotable together or independently from each other.

BRIEF DESCRIPTION OF THE DRAWING

The invention will become more readily apparent from the following description of the preferred embodiments thereof shown in the accompanying drawing, in which.

DESCRIPTION OF THE PREFERRED EMBODIMENTS

Figure 1:
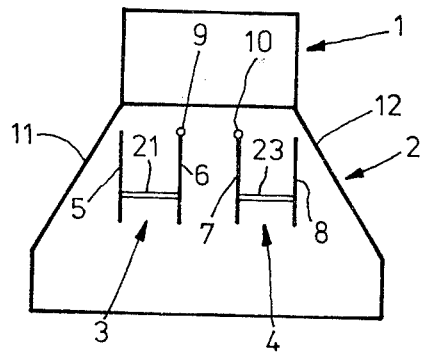
FIGS. 1, 2, and 3 are similar top views of the air outlet grill according to the present invention with the upper cover wall of the housing being removed, illustrating various possibilities of positioning of the vane-shaped air guiding elements.
Figure 2:
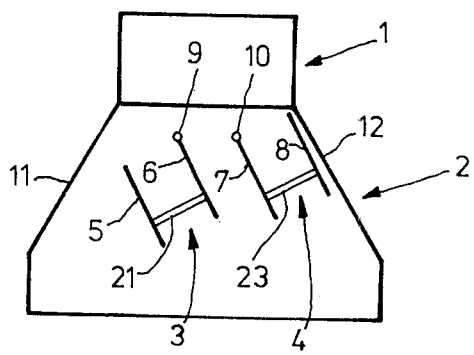
Figure 3:
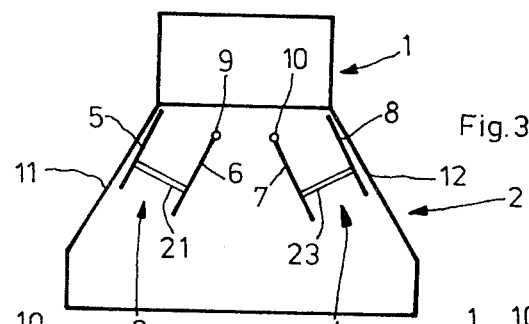
Figure 4:
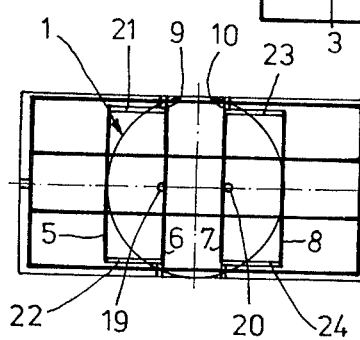
FIG. 4 illustrates the air-flow grill according to the present invention in front view.

With reference to FIGS. 1, 2, and 3, it is seen that the air outlet grill according to the present invention includes a general housing and the air outlet grill itself can be divided into two major sections, the first of which is an air entry region or section 1 and into an adjusting region or section 2. As can be seen in all figures the common characteristic of the air outlet grill according to the present invention is that the adjusting section 2 thereof has a cross-sectional dimension which increases in the direction of the air outflow so that the adjusting section 2 is illustrated as being funnel-shaped. The general cross-sectional area viewed from the front of the adjusting section 2 is rectangular. The air entry section 1 can have a pipe or circular cross-section as illustrated in FIG. 4.

In the embodiment illustrated in FIGS. 1, 2, and 3, the air outlet grill according to the present invention is provided with a pair of groups of air guiding elements 3 and 4 of which each is provided with air guiding elements 5, 6 and 7, 8, respectively. The air guiding elements 5 and 6 of the first group 3 and the elements 7, 8 of the second group 4 each are provided with a common pivot axle 9 and 10, respectively, which pivot axles 9 and 10 are supported on wall portions of the air outlet grill lying behind and in front of the plane on the drawing in FIGS. 1, 2, and 5.

As can be seen in FIG. 1, the guide elements 5 and 6 and 7 and 8 which within the same group are pivotable together, however, are independently pivotable within the two groups 3 and 4, are lying parallel with respect to each other. Such positioning of the elements 5–7 of the pair of groups 3 and 4 corresponds to the minimum width of air flow, which in turn means maximum flow speed for the air coming out from the entry section 1. In addition, it can be seen that the exit direction of the air flow is identical with the axial direction of the air-flow grill.

Considering now FIG. 3, it is seen that both groups 3 and 4 are pivoted into a position in which their respective air guiding elements 5, 6, and 7, 8 lie approximately parallel to the respective adjacent wall portions 11 and 12 of the housing of the air-flow grill. At such position, a maximum width for the air flow is attained, however, it is accompanied by a diversion of the flowing air away from the axis of the air-flow grill arrangement, so that the speed of the air flow in the vicinity of the body exposed to the air flow is reduced to a minimum with respect to other possible positioning of the air guiding elements.

With reference to the positioning illustrated in FIG. 2, it is seen that only the group 4 of the air guiding elements are pivoted into an approximately parallel extreme position with respect to the adjacent wall 12, while group 3 of the air guiding elements is pivoted to assume a parallel position to the group 4. Under this condition, the width of the air flow remains about the same, however, there will be a change in the direction of the air flow. By moving the air guiding elements of groups 3 and 4 into an intermediate position between those illustrated in FIGS. 2 and 3, one may vary the width of the air-flow as well as the direction of the air flow within certain limits. The moving of the air guiding elements of each group is performed by appropriate levers 19 and 20 as shown in detail in FIG. 5.

Figure 6:
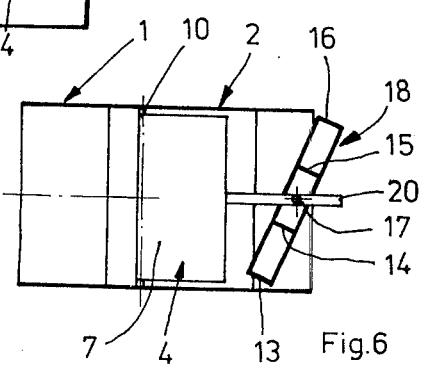
FIG. 6 illustrates the air outlet grill of FIG. 5 in a different view.
Figure 5:
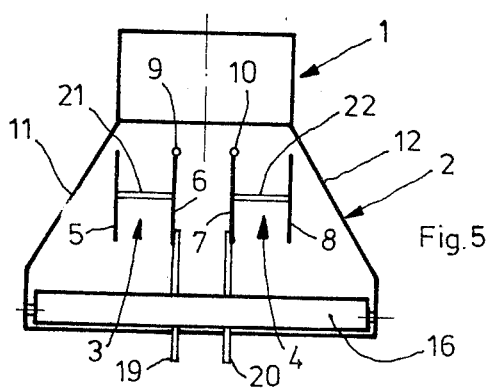
FIG. 5 illustrates a different embodiment of the air outlet grill according to the present invention in a view similar to those of FIGS. 1–3.

In FIGS. 4–6, the reference numerals used in FIGS. 1–3 identifying the same elements will remain the same. The arrangement according to FIGS. 1–3 allows the adjusting of the exit direction of the flow only in one plane, however, the arrangement according to FIGS. 4–6 will provide for additional features in the adustment of the exit direction. There are provided four further air guide elements 13–16 which are joined into a unit 18 pivotable about a common axle and arranged downstream of the groups 3 and 4 of the air guiding elements when viewed in the direction of the air flow. Through the space between the further air guiding elements 14 and 15 protrude a pair of operating levers 19 and 20 for the two groups 3 and 4. As can be seen from FIGS. 4–6, the pivoting axle 17 of the further air guiding elements 18 runs perpendicularly to the pivoting axles 9 and 10 of the air guiding elements 5–8.

The air guiding elements 5–8, and those of the unit 18 in the illustrative embodiments herein are illustrated as rectangular thin vanes so that their edges do not present practically any flow resistance to the air flow. The joining of the air guiding elements into a group, as described above, is performed by thin webs 21–24 placed between the end edges of those air guiding elements which are joined into a single group.

The further air guiding elements 13–16 joined into the unit 18 may be also split into two groups similarly as the guide elements 5–8 and thereby to provide an arrangement in which the width of the air flow can be adjusted into planes lying perpendicular to each other.

While the construction according to German OLS No. 1,430,300 and according to DAS No. 1,812,283, both mentioned above, provide for the common pivoting of all air guide elements and thereby are limited only to the possibility of adjusting the direction of the exiting air flow only and, while the construction according to U.S. Pat. No. 2,790,371 requires the individual positioning of all the air guiding elements and thereby unnecessarily complicates the adjustment operation, it has been shown that the present invention provides for the joining of the air guiding elements into two groups 3 and 4, the air guiding elements of each group being pivotably arranged together, however, the air guiding elements of each group 3 and 4 are arranged for pivoting movement individually and independently with respect to each other, thereby independent or joint positioning of the air guiding elements of each group is possible, as may be desired.

The air guiding elements present in each group are joined together within their respective group. This, however, does not exclude the possibility that a third group preferably lying between the two groups 3 and 4 could not be provided with air guiding elements, which third group could be adjusted individually or could be mounted rigidly within the housing of the air-flow grill.

Experiments have shown that a small number of air guiding elements in each group, for example, a pair of air guiding elements in each group, already gives sufficient results.

The air guiding elements in each group 3 and 4 may be arranged to pivot individually about a pivot axle associated with each air guiding element and to have a common driving axle similarly as in DAS No. 1,812,283, however, as has been illustrated in the preferred embodiments of the present invention, in each group the guide elements have a common pivot axle 9 and 10. The arrangement of the pivot axles of the respective groups can be such that the pivot axle can be placed in the region of the adjacent air guiding elements of the two groups as can be seen in the illustrating figures. The adjacent air guiding elements are to be understood as the innerlying air guiding elements 6 and 7 in FIGS. 1–3 and FIG. 5. When each group contains few air guiding elements, for example, a pair of guide elements, then the pivot axles 9 and 10, can engage the back edges when viewed in the direction of the air flow of the two air guiding elements 6 and 7 of the two groups 3 and 4, which face each other or which are the innermost lying air guiding elements of the two groups. This fact is in harmony with the feature that the adjusting section of the air outlet grill is increasing in the direction of the air exit.

In order to attain a desired change in the flow velocity of the air in the vicinity of the body exposed to the air flow, the guide elements, at least in one of the groups, are arranged so that they could be pivoted to a position lying approximately parallel with the edges in the wall of the air-flow grill. Preferably, the guide elements of both groups 3 and 4 are arranged to be pivoted in the aforementioned manner so that the guide elements of both groups 3 and 4 in their extreme pivoted position could enclose a similar angle with respect to each other as that of the tapering wall portions of the air-flow grill illustrated in the figures.

In the event the direction of the air flow is changed, then the air guiding elements are pivoted into a direction lying parallel with respect to each other. For this purpose, as described in the illustrative embodiment according to the present invention, the air guiding elements of both groups 3 and 4 must be pivoted into a position when both groups 3 and 4 must be pivoted into a position when both groups lie approximately parallel to each other and they lie parallel with the wall portion lying adjacent to one of the groups, as illustrated in FIG. 2.

Inasmuch as with the arrangement having the pair of groups of air guiding elments, the direction of the exiting air can be changed only in one place, the invention also has been described to provide for means for enabling the changing of the direction of the exiting air in a plane additionally, which additional plane lies perpendicular to the first general plane. Such additional adjusting of the air exit direction could be had by pivoting the entire outlet grill at its air intake side in a plane, however, the invention as has been shown, provides for additional air guiding elements 18 which lie downstream with respect to the two groups 3 and 4 of air guiding elements and which can be pivoted in a plane lying perpendicular to the pivoting axle 9 and 10 of the two groups 3 and 4 of air guiding elements. In the latter arrangement, the operating levers 19 and 20 of the two groups of air guiding elements 3 and 4 protrude through the additional group 18 of air guiding elements.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A ventilating grill with air flow comprising
   a housing having an air inlet and a longitudinally spaced air outlet, an input section extending from said inlet towards said outlet, and an air flowing adjusting section extending from said input section to said outlet and having an interior cross-section which diverges in direction from said input section to said outlet;
   two groups of said vane-shaped air guiding elements in said adjusting section and each composed of a plurality of mutually parallel ones of said air guiding elements;
   means spacing said air guiding elements of each group apart so as to maintain a mutual parallelism and constant air flow area regardless of the pivotal position of said air guiding elements;
   means connecting said air guiding elements of each group for joint movement; and
   common pivot means mounting said air guiding elements of each group for pivotal movement in mutual parallelism about pivot axes located in a common plane extending substantially normal to said direction so that the direction and speed of air flowing through said outlet can be changed by pivoting of said groups of air guiding elements without thereby changing the quantity of air flowing through said outlet since the crosssectional area for passage of the air between adjacent ones of said air guiding elements remains substantially constant during such pivoting.

2. The flow control apparatus as claimed in claim 1, wherein said pivot axes of said groups of air guiding elements are located in the region of the outermost and adjacently lying air guiding elements of said two groups.

3. The flow control apparatus as claimed in claim 1, wherein said adjusting section comprises a pair of tapering wall portions, at least one of said groups of air guiding elements being arranged for pivotable movement into a position wherein the air guiding elements in said one group lie parallel with the adjacent one of said tapering wall portions.

4. The flow control apparatus as claimed in claim 2, wherein said adjusting section comprises a pair of tapering wall portions, both groups of air guiding elements being arranged for pivotal movement into positions wherein the air guiding elements of each group lie parallel with the wall portion adjacent the other group.

5. The flow control apparatus as claimed in claim 1, wherein each group comprises a pair of said air guiding elements.

6. The flow control apparatus as claimed in claim 1, wherein said mounting means are coupled to the back edges of said adjacently lying air guiding elements of said pair of groups.

7. The flow control apparatus as claimed in claim 1, wherein additional air guiding elements are provided downstream of said pair of groups of air guiding elements, means for pivotally mounting said additional air guiding elements within said adjusting section for enabling pivoting of said additional air guiding elements in a plane perpendicular to the plane of pivoting of said two groups of air guiding elements, whereby the direction of the air flow is adjustable in various planes.

8. The flow control apparatus as claimed in 1, wherein said air inlet has a round cross-sectional shape and wherein said adjusting section is funnel shaped and said air outlet has a rectangular exit profile.

9. The flow control apparatus as claimed in claim 1, further comprising operating lever means for each group of air guiding elements, said operating lever means protruding out of said adjusting section.

10. The flow control apparatus as claimed in claim 7, wherein said additional air guiding elements are manually adjustable and include means for pivotal mounting on said wall portions of said adjusting section.

11. The flow control apparatus as claimed in claim 3, wherein said mounting means for said groups of air guiding elements are secured to a front and back wall portion of said adjusting section, wherein said groups of air guiding elements in an unpivoted position assume in said adjusting section a position allowing for maximum width of air flow through said flow control apparatus, and wherein said groups of air guiding elements when pivoted away from each other toward said tapering wall portions of said adjusting section are adapted to vary the speed of air flow through said air control apparatus.

* * * * *